(12) United States Patent
Rosales Ureta

(10) Patent No.: US 8,925,312 B2
(45) Date of Patent: Jan. 6, 2015

(54) PROPULSION OR MOTOR DEVICE FOR CONVERTING ENERGY INTO POWER, USING THE FORCES GENERATED BY THE SURFACE MOVEMENT OF A LIQUID OR FLUID OR THE LIKE

(76) Inventor: Victor Hugo Rosales Ureta, Santiago (CL)

( * ) Notice: Subject to any disclaimer, the term of this patent is extended or adjusted under 35 U.S.C. 154(b) by 169 days.

(21) Appl. No.: 13/509,283

(22) PCT Filed: Nov. 12, 2010

(86) PCT No.: PCT/CL2010/000048
§ 371 (c)(1),
(2), (4) Date: May 11, 2012

(87) PCT Pub. No.: WO2011/057420
PCT Pub. Date: May 19, 2011

(65) Prior Publication Data
US 2012/0227396 A1    Sep. 13, 2012

(30) Foreign Application Priority Data

Nov. 13, 2009    (CL) .................................. 2075-2009

(51) Int. Cl.
*F03C 1/00*    (2006.01)
*F03B 13/10*    (2006.01)
*F03B 13/18*    (2006.01)

(52) U.S. Cl.
CPC ............. *F03B 13/1815* (2013.01); *Y02E 10/38* (2013.01)

USPC .................. 60/498; 60/500; 60/506; 290/42; 290/53

(58) Field of Classification Search
CPC ........................................ Y02E 10/38
USPC ................... 60/495–507; 290/42, 53
See application file for complete search history.

(56) References Cited

U.S. PATENT DOCUMENTS 4,661,716 A * 4/1987 Chu ............................... 290/53
6,681,572 B2 * 1/2004 Flory .............................. 60/507

FOREIGN PATENT DOCUMENTS

CN    201180779 Y  *  1/2009

* cited by examiner

*Primary Examiner* — Hoang Nguyen
(74) *Attorney, Agent, or Firm* — Furr Law Firm; Jeffrey M. Furr, Esq.

(57) ABSTRACT

Propelling device or engine to transform potential energy into power, using the forces produced movement of a liquid surface or fluid or similar, more specifically, the device is made arranged means to exploit synergistic four forms of surface displacement of the fluid wave, objectively the upward, downward, forward wave toward the shore and pulling inward, in order to produce conventional and renewable energy more efficient than currently used systems with minimal mechanical efforts, whose employment is varied, for pumps, single or hydraulic; to generate electricity, to generate the movement of maritime vessels of any size or movement of vehicles or land machinery land, for hydropower generation, etc.

6 Claims, 8 Drawing Sheets

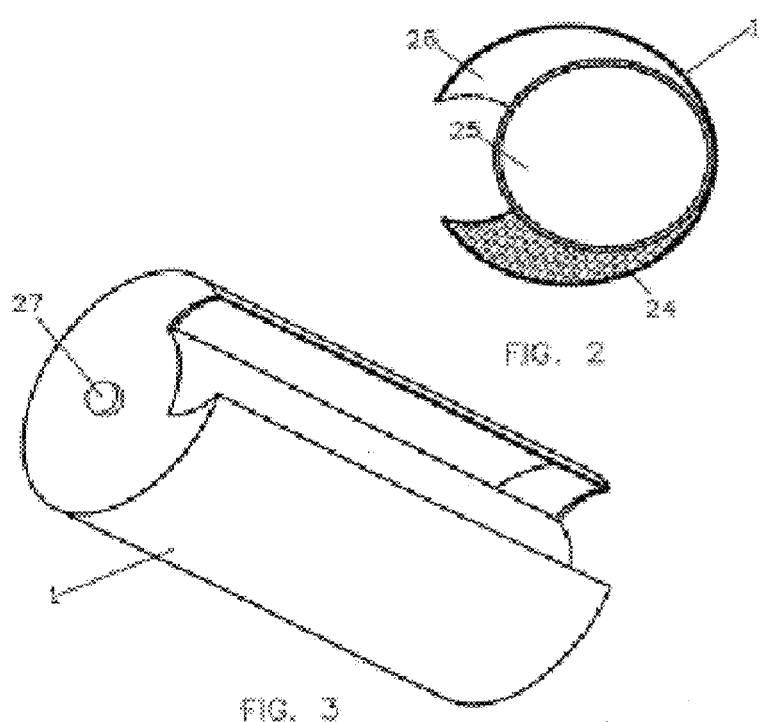

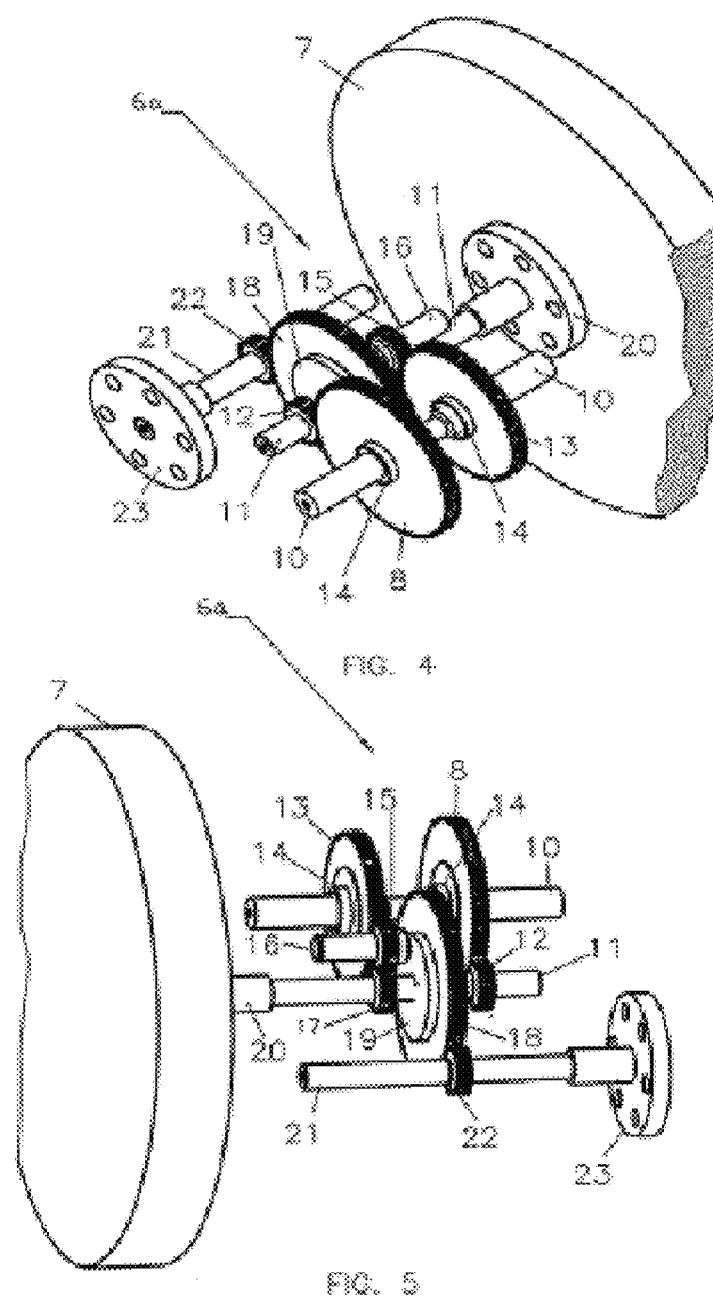

PROPULSION OR MOTOR DEVICE FOR CONVERTING ENERGY INTO POWER, USING THE FORCES GENERATED BY THE SURFACE MOVEMENT OF A LIQUID OR FLUID OR THE LIKE

BACKGROUND OF INVENTION

As refers to the state of the art for devices to produce energy using the movement of liquids or fluids in general, we quote patent ES 2237269, which refers to a system to generate energy from sea movement consists of a platform (1) floating and solidarity to a unidirectional gear (4). This drive shaft (3) is enshrined to a multiplier box (5) which brings together any number of transmission gears (6), which act on the power generator turbine (7), connected to an inertia flywheel. This system works from the natural sea movement and can be applied both at sea and on the shore, being provided with accurate anchoring system. It can be applied to any reservoir, pool or similar, to provide a wave motion, natural or artificial, on its surface. Another invention is the patent W0100317DK, which refers to a wave energy system that comprises rocker floats on tube ending in swing, which are arranged in block bearings mounted on one or more drive shafts attached to a concrete pillar, a boat or a similar device interconnected to allow the entire force is transferred to a gearbox and an electric generator for use in seas, lakes, oceans and other reserves of water with up and down undulating movements, whose purpose is to turn the drive shaft and transfer constant force to a gearbox and a generator capable of producing electricity. Alternatively, the wave power machine can be equipped with blade arms. This model can be placed in waters with strong currents, for example, Lillebaelt, or in rivers or similar places. The wave energy machine includes an electric lift in which the electric motor electric lift is operated from a control box and rocker rising from the water if wind is too strong, waves are too high, water temperature too low, gear or generator too high temperature or during repair of wave energy system or other circumstances, and wave power machine stops its production. The wave power machine can be set on concrete blocks or on an adjustable foot at the bottom of the sea or can be mounted on a floating object (e.g. a boat) or similar sites.

SUMMARY OF THE INVENTION

Drive device or motor to transform energy into power, using the forces produced by superficial movement of liquid, fluid or similar, more specifically, the device is made by synergistic means disposed to take four forms of wave surface displacement of the fluid, the upward movement objectively, objectively the upward, downward, forward wave toward the shore and pulling inward, in order to produce conventional and renewable energy more efficient than currently used systems with minimal mechanical stress, use of which is varied, pumps, single or hydraulic, to generate electricity, to generate the movement of maritime vessels of any size or movement of vehicles or land machinery for hydropower generation, etc. According to the devices or systems to generate energy in general exists today; we can state that the invention has the following advantages:

Under the elements and means of low complexity that make this device or engine, allowing less production or construction costs than the currently available devices, as these elements and means which forms are easy to manufacture.

Its maintenance is economical and easy to make.

Its location or placement can be done in the most diverse areas can also adjust in any kind of fixed or mobile device that requires the use of driving force, where it simply is essential that they originate or produce a minimum of wave motion.

Non-polluting, clean and constant energy use, being this feature influential as any other equipment or motors require a type of fuel or energy use varies clean energies such as wind, solar, not depending on seasonal changes.

By the means and disposal that makes this device or engine, able to produce more energy with minimum use of movement and with the least mechanical stress, that devices currently known.

BRIEF DESCRIPTION OF THE DRAWINGS

Without restricting the full scope of this invention, the preferred form of this invention is illustrated in the following drawings in which:

FIG. 2 shows a cross section of the float.

FIG. 3 shows a perspective view of the float.

FIG. 4 shows a perspective view of a moving parts.

FIG. 5 shows a side view of the moving parts with a gear system arranged on separate shafts.

BRIEF DESCRIPTION OF THE PREFERRED EMBODIMENTS

Figure 1:
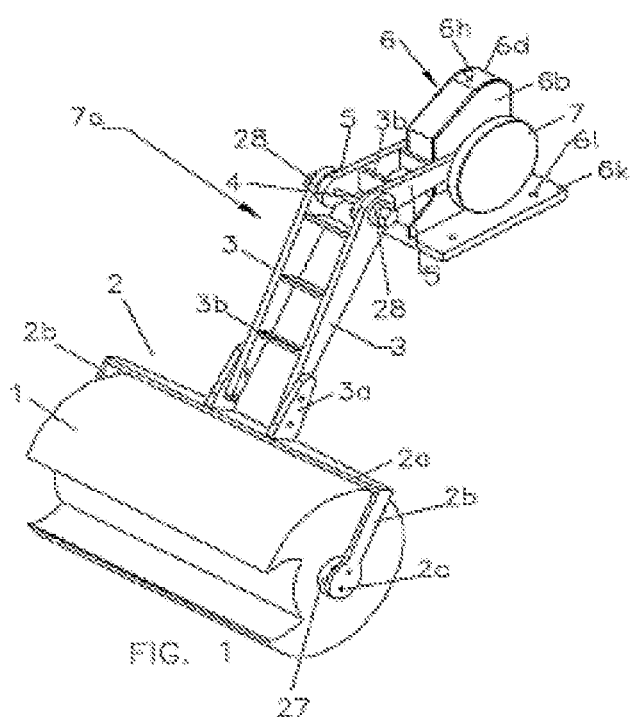
FIG. 1 shows the current invention.
Figure 6:
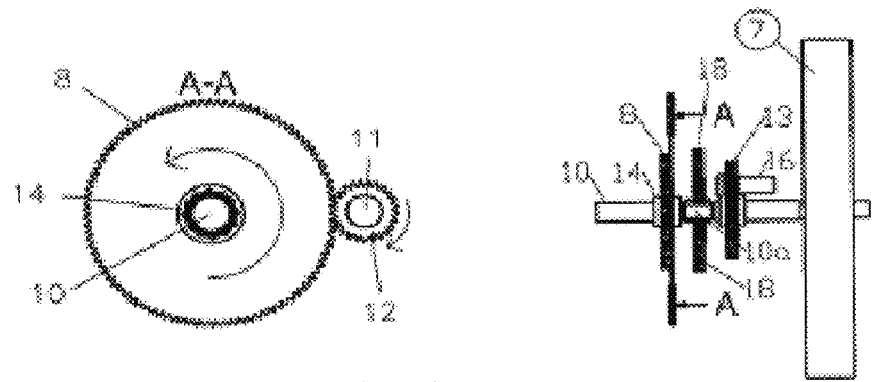
FIG. 6 shows a detail in cross-section AA of the series of gears, and two gears of different diameter, with directional movement indicated.
Figure 7:
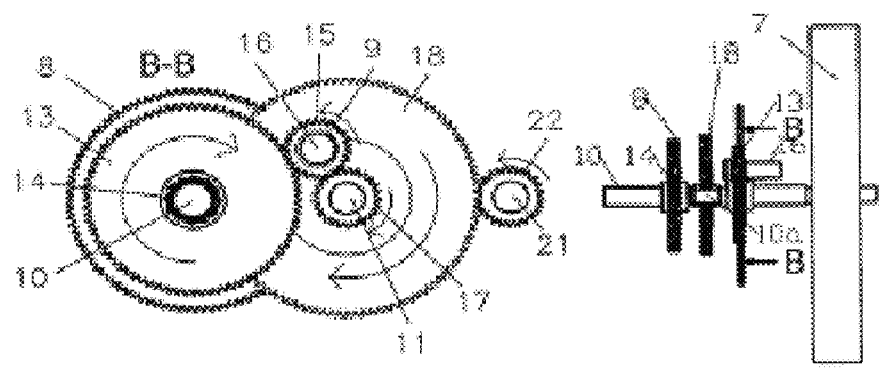
FIG. 7 shows a detail in cross section BB of the series of gears and two sets of large and small gears diameter, to produce a unidirectional movement as indicated by the arrows.
Figure 8:
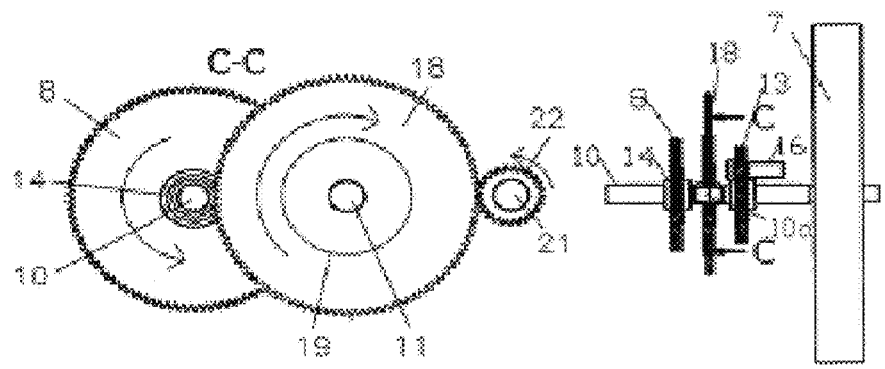
FIG. 8 shows a detail in cross section CC of a series of gears to produce a uni-directional movement as shown by the arrows.
Figure 9:
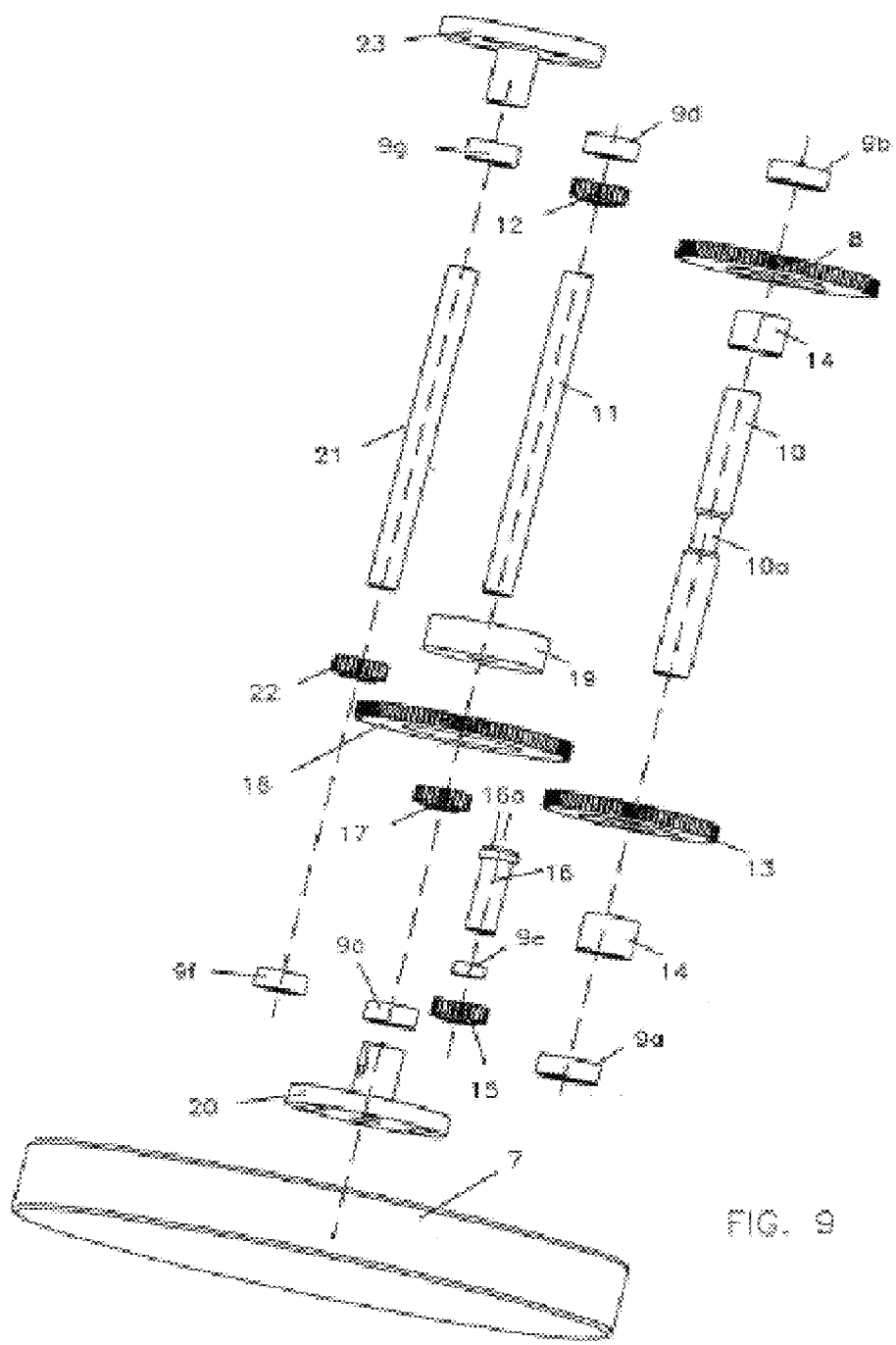
FIG. 9 shows an exploded view of the system of gears, to produce energy.
Figure 10:
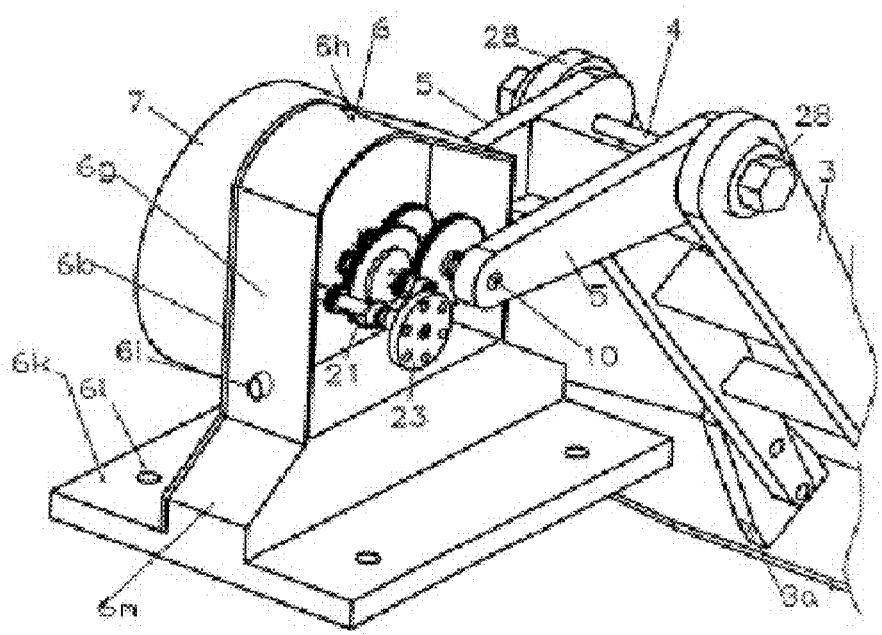
FIG. 10 shows a detail of the outer casing, the gear system, a flywheel accumulator, and the system of levers.
Figure 11:
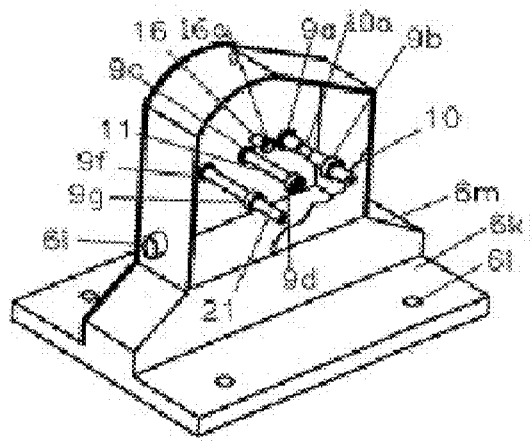
FIG. 11 shows the supportive axle gear housing.
Figure 12:
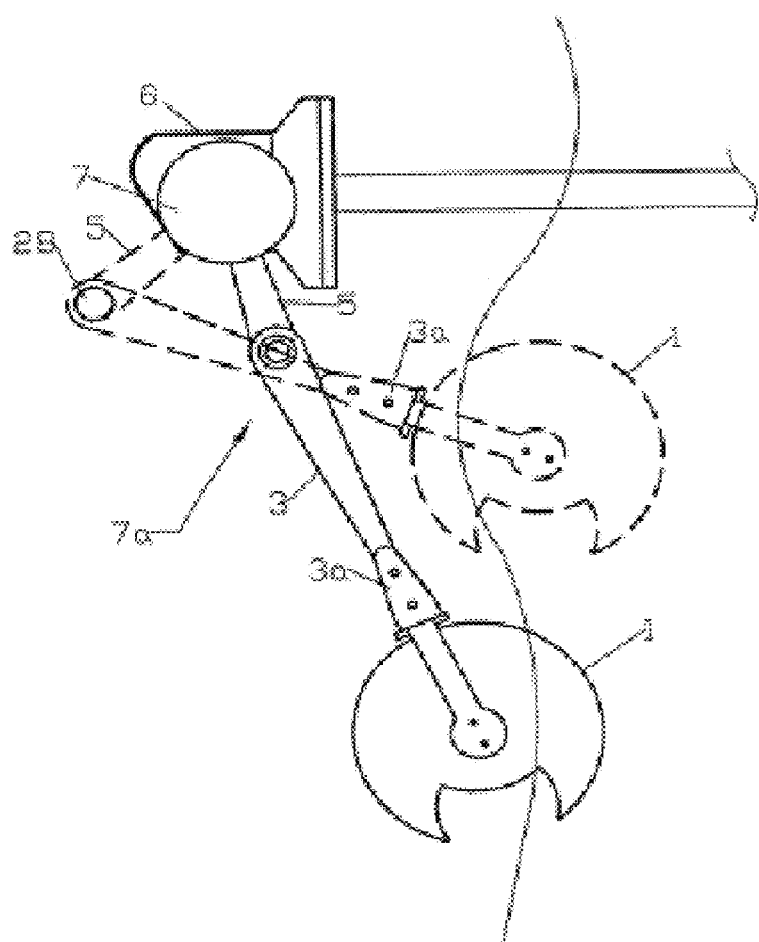
FIG. 12 shows a graphical view of a sequence of float behavior and levers with respect to wave motion of the fluid.
Figure 13:
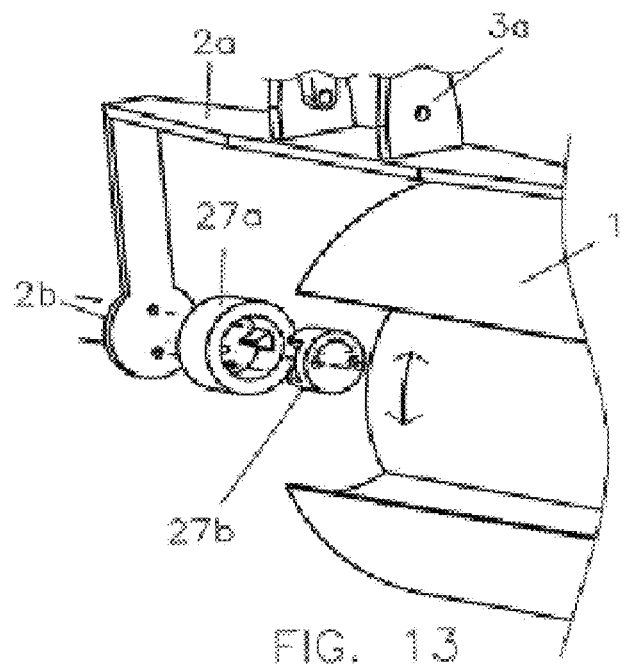
FIG. 13 shows a detail of a piece that attaches the float.
Figure 14:
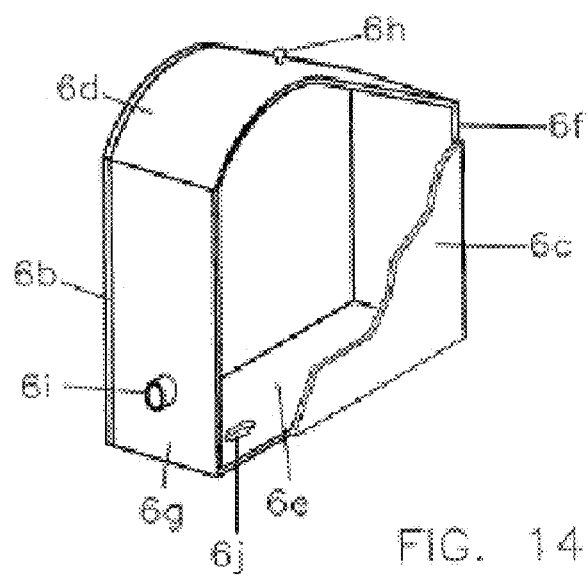
FIG. 14 shows a perspective view of the block, with a cut in one of its walls, inside of which houses a gear system.

According to the patent drawings of FIGS. 1 through 14, the device or engine to generate power or exploiting the wave motion of a fluid or liquid in general consists of a metal block 6, inside which has a gear system 6a, a flywheel accumulator 7 kinetic energy, an articulated system of levers 7a and a float sensor 1 potential energy. The metal block 6 is composed of a hollow body or casing consisting of two metal side walls (6b) made up for support the axle with the gear system 6a; It also has a top cover 6d and a lower floor 6k, also has a front wall and a rear wall to contain all sealed lubricating oil. Wherein the top cover 6d has a hole with cap 6h for filling the lubricating oil. Similarly, the lower floor has a hole 6j with drain plug and oil on the rear wall is provided with a hole 6i to accommodate a controller display oil level.

In the metal block 6 hosts inside the drive gear, which is formed with a main shaft motor 10, a secondary shaft 11, an investor axis of rotation 16 and shaft rpm 21, arranged perpendicular to the wall 6b and equidistant and parallel the walls 6g, 6f of said block 6. The main thrust of propulsion engine 10, has a central rebate 10a to allow the free rotation of a gear 18 and keep the distance and separation between the axes mentioned above; moreover, the drive shaft at one end receives a bearing and seal 9a, which is fixed to the wall 6b and on the other end receives a bearing, which is set at the other wall of the block 6; in this axis two ratchets 14 arranged in found act jointly, on the outside are linked to the gears of larger diameter 8 and smaller diameter 13, which have the same configuration. Also, the motor main shaft fixed with articulated arms 5 corresponding to the lever system 7a.

The shaft 11 is also supported on both sides 6b,6c of the block 6, which is attached at one end a flange 20 provided with holes 20a, that is set by bolts to a kinetic energy accumulator wheel 7, the shaft 11 rests with a bearing and seal on the wall, on the element at its central part is an independent gear of larger diameter 18 which fits with a clutch 19, which is of greater width than said gear 18 existing on both sides of this element and on the same axis, twin gears 12, 17 integral to the shaft 11 to finally rest the shaft with a bearing and seal 9 on the wall 6c. The investor axis of rotation 16 is shorter than the previous axis, which is integral with the block, which sets a lower gear 15 that rotates on a bearing and shaft rotation investor 16, the element is supportive with the side wall 6b, provided further with extreme head retention 16a.

Rpm shaft 21 is provided with a bearing and seal, which is fixed on this element a gear 22 and a bearing end on the side wall. At the outer end of the shaft is attached a bridle 23, to which you can set any device or means for propulsion; said rpm shaft is supported at both ends to the wall 6b, 6c.

The gear system 6a is concatenated as follows: Main motor shaft gear, drives the gear for the shorter axis, which also performs the function of inverter rotation and is in turn driver of the gear corresponding to the axis; gear for the main shaft of propulsion motor, gear is conductive, corresponding to the secondary shaft and finally the central independent gear, corresponding to the secondary shaft, drives the single gear, corresponding to the axis flange.

The lever system 7a is composed of two parallel arms 5 and 3 pivoting above, which are fixed by the ends of the of propulsion motor shaft, those upper arms 5 are attached with two lower arms of greater length, with one labeled and springs 28 as a means of hinging and pivotal movement. Both lower and above arms, include two semicircular ends triangular bars 3a, joined inverted said arms are joined in parallel with cross bars 3b and lower arms are set to turn, with the sensor potential energy float, with grab bars, which are on a hairpin, formed with a transverse top bar 2a, end of which are prolonged in perpendicular form, longitudinal bars 2b with semicircular ends 2c, which are attached to the sensor potential energy float 1 by its side ends, by a connector/end travel stop 27a, 27b which is made up with a cylindrical piece 27 which engages open another piece, cylindrical with fixing holes 6l and perpendicular walls 6b with cut areas, such pieces allow the float pivot angle sensor 1 potential energy, which consists of a drical body longitudinal section, equipped with a central chamber 25, an upper chamber 26 and a lower chamber 24 and a discharge or central longitudinal section.

The metal block 6 is composed of a body of appropriate geometry to contain the entire set of elements while maintaining the parallelism of the axes, hosts bearings and seals respective axes, requested support efforts and provide a basis for anchoring 6l. Such component is able to hold tight inside biodegradable oil to lubricate the gear systems 6a and protect them from oxidation, prepared for operate in both river banks in water or any fluid in motion, is mounted on a floating structure, moving or still, within which, is the set of gears 8, 12, 13, 15, 17, 18, 22, whose function is to ensure that the torque transmitted by the lever system 7a in its upward and downward movements are transformed into unidirectional rotation always in the same direction of rotation with the lowest friction loss in the process, This is achieved by making when the arm movement of the lever system 7a is up, the system only makes that gear 13 transmit movement, while only acts when it is descending gear, both gears receive the main shaft torque and these gears are mounted on bearings ratchets, which are arranged in such a way that allows rotation in one direction and the other in the opposite direction, which in turn are housed in said engine main axis 10; see FIGS. 4, 8, 10. This shaft is mounted on the metal block 6 by bearings 9a, 9b at each end. This axis 10 will never complete turns only radio segments and is the only bi-directional axis movement occurs according to the working fluid in motion. When the gear working is gear shaft, serves as a conductor, led lower by moving the gear making the latter invest the rotation and its difference in diameter increases the revolutions transmitted to the secondary shaft, which by being mounted on bearings 9c, 9d embedded in the sidewalls of the block, transmit the torque directly to the flywheel kinetic energy storage whose function is to maintain uniformity of the independent revolutions of the pulses provided by all organs of the machine. This flywheel kinetic energy storage system is connected to the secondary shaft with the flange coupling 20, see FIGS. 4 and 8.

When the main shaft for the gear motor, acts and functions as a conductor on the gear which is mounted on a bearing which is installed in the central fixed shaft joined to the metal block 6, This is achieved by reversing the first and in turn by the difference in diameter between the gears increases the revolutions. At this time the gear rotates in the opposite direction resulting motion produced by the performance of gear so it is necessary to prevent the system locks, for this is must invest this rotation through the driven gear for the secondary shaft, which transmits its torque to the wheel acting on the energy storage in the direction of rotation. On the secondary shaft is mounted on the clutch jointly, the purpose of which is to regulate that this torque that exceeds the maximum for which it was designed the system, not be transmitted to the gears, avoiding damages. Joint to the clutch is the gear, the highest one, whose main task in relation to the driven gear is to increase its revolutions by the fact to exist a 1 to 5 relationship between them, in its initial stage, a relationship that is increased in successive stages. This last gear is integrally mounted in the central to the axis, transmitting the torque to it. Which is mounted to the block at its ends by bearings 9f, 9g, allowing rotation synchronously with the axes, and exterior of the shaft attached a flange 23. To this coupling flange 23 can be connected a generator, a pump and/or any other device that requires energy for its operation.

This whole system of gears receive the torque due to the work of all levers 7a located outside the block. The set of levers 7a varies the transmission of movements and forces executed by the float depending on the proportions of the lengths of the arms 5 where it is possible handle the torque and revolutions that will be transmitted to the gear set. Thus we will be increasing or decreasing these variables, to say that when the lower arms of greater length than the superior are transmitted as much revolutions at the expense of torque and back. The system of said arms 5 are connected together by through a ball head 4 as a drawing pantograph, which decreases or increases the scale, as the float moves towards or away from the block 6. When said float is on, causes the arms 5 to come together to produce the upward movement and when they move away produce a downward movement, in both movements the device will be capturing and generating energy. Two radial springs 28 in its ends are hosted on ball head 4, in order to restrict the angle between the upper 5 and lower arms 3, avoiding collisions with each other and also help the float block stay away from a vantage point for recovering energy capture. The set of levers 7a is connected to the float through the lower ends of the arms, with one fork 2 piece, which is connected at both ends of a connector/travel stop 27. This fork 2 has a dual function, the first is to hold of enabling its pivoting float along its longitudinal axis and the second is to control the angle of the pivot through said connector/travel stop, will depend upon the particular design and environmental conditions to install. This prevents that the float rotates freely on its axis, allowing the capture of the shoves of the fluid motion by the work of the G constant. The float is made with three types of cameras: a longitudinal first stagnant camera capable of holding liquids or solids, which is located at the bottom of the float, a second longitudinal chamber filled with air stagnant and located in the center of the float chamber and on said chamber, a third one with longitudinal concave configuration and open to capture a volume of water in each wave to improve engine performance. These three kinds of cameras have the mission to capture the energy produced by movement of the fluid, see FIG. 11, which together develop a movement that can be variable: up, down, forward wave to the edge and retraction offshore.

1.—Upward movement, the camera is what gives buoyancy to the element so when the float is moved within the wave from the valley to the peak, camera that moves a weight equal to the product of its volume by the density of the fluid with an upward force vector which will be forwarded to the rest of the system.

2.—Downward movement, to exploit this movement makes use of two elements both through the G constant, the first is the weight of the float and lever set and the second is the weight of the contents of the lower chamber 24 which can be solid or liquid material with the minimum condition that the final density of this camera is at least equal to the density of the fluid in which this element is embedded, that working with the G constant prevents the float rises above the surface.

3.—Advancing towards the block wave: To make this movement exists an open concave upper chamber, arranged so that the wave motion can be filled or emptied of liquid or fluid able to produce a thrust that will become a movement to approach to block.

4.—Forward wave block in the opposite direction: In places where it exists this movement, as in shallow waters of the sea, the time of the motion, two phenomena occur simultaneously: on one hand the water level or fluid down producing a vector direction and at the same time gravitating vector producing thrust in water, both variables combined with the action of the spring and buoyancy of the intermediate chamber causing the pivot of all the arms of the lever system, in opposite direction to the block being in position to receive the thrust in the opposite direction, thus the float does keep moving and transmitting constant and permanent force.

The invention claimed is:

1. A device to transform energy, using the forces produced by movement of a liquid surface or fluid comprising;

a metal block with a gear system inside, a flywheel kinetic energy accumulator, an articulated system of levers and a float sensor potential energy, where the metal block has a lower base with an upper surface that has a central support body composed of two metal side walls with supports shafts that support a drive gear, where the body has a top cover, a lower floor; a front wall and a rear wall which are sealed to contain a lubricating oil, where the top cover has a hole with a stopper for filling the lubricating oil, where the lower level has a hole with a stopper for emptying the oil and a posterior wall which has a hole with a viewer controller for oil level;

having levers consists of two parallel upper arms, which are fixed by the ends of a propulsion shaft, these upper arms are joined with two lower arms of greater length connected by a ball head and springs as a means for hinging and pivoting said lower arms and upper arms, where the lower arms are connected to a potential energy sensor float by forked clamping bars;

where the potential energy float sensor has a cylindrical body longitudinal section that has three chambers, a longitudinal first stagnant camera capable of holding liquids or solids which is located at the bottom of the float, a second longitudinal chamber filled with air stagnant and located in the center of the float and a third one with longitudinal concave configuration and open to capture a volume of water in each wave.

2. A device according to claim 1; where the gear system has a main shaft motor, a secondary axis, an inverter axis of rotation and a rpm shaft, arranged perpendicular to the wall and equidistant and parallel to the walls of the block and where the main shaft drive motor has a central undercut with a propulsion shaft.

3. A device according to claim 1; where in the gear system the main shaft motor drives a shorter shaft which serves as the inverter rotation and is the driver of the gear that corresponds to the axis, the gear that corresponding to the main shaft propulsion motor is driver of the gear that corresponds to the secondary shaft and a central independent gear corresponds a secondary axis and is the driver for a single gear that corresponds to the axis with flange.

4. A device according to claim 1; where the cameras capture four directional surface movements because the potential energy float sensor, is composed of a cylindrical body longitudinal section, equipped with a central chamber, an upper chamber and a lower chamber and a central longitudinal discharge.

5. A device according to claim 1; where the fork is formed with a transverse top bar end of which extend at right angles, longitudinal bars with semicircular ends which are set by the sides of the potential energy sensor float via a connector-end travel stop.

6. A device according to claim 1; where there the cylindrical body has fixing holes and perpendicular walls with cut areas that allow the angle float pivot potential energy sensor.

* * * * *